US006349250B1

(12) United States Patent
Hart et al.

(10) Patent No.: US 6,349,250 B1
(45) Date of Patent: Feb. 19, 2002

(54) CLEAR HISTORIC DATA FROM A VEHICLE DATA RECORDER

(75) Inventors: David Lloyd Hart, Ann Arbor; Richard M. Avery, Jr., West Bloomfield, both of MI (US)

(73) Assignee: Detroit Diesel Corporation, Detroit, MI (US)

( * ) Notice: Subject to any disclaimer, the term of this patent is extended or adjusted under 35 U.S.C. 154(b) by 0 days.

(21) Appl. No.: 09/698,530

(22) Filed: Oct. 26, 2000

(51) Int. Cl.[7] .......... G06F 7/00
(52) U.S. Cl. .......... 701/35; 73/117.2
(58) Field of Search .......... 701/35, 29, 34, 701/99; 340/483, 441, 440; 702/187; 73/116, 117.4, 117.2

(56) References Cited

U.S. PATENT DOCUMENTS 5,964,811 A * 10/1999 Ishii et al. .......... 701/29
5,964,813 A * 10/1999 Ishii et al. .......... 701/35
5,968,101 A * 10/1999 Schleupen et al. .......... 701/35
6,006,146 A * 12/1999 Usui et al. .......... 701/29
6,167,338 A * 12/2000 De Wille et al. .......... 701/35
6,294,988 B1 * 9/2001 Shomura .......... 701/99

* cited by examiner

*Primary Examiner*—Richard M. Camby
(74) *Attorney, Agent, or Firm*—Brooks & Kushman P.C.

(57) ABSTRACT

A method of operating an electronic control module disposed on a vehicle and operative to record in a memory a plurality of data items among a plurality of pages, and a computer program for execution by the electronic control module are disclosed. The plurality of data items include at least one event item and at least one accumulation item for the vehicle. In operation, recording of the at least one event item is disabled in a selected page of a plurality of pages in response to receiving a stop recording page signal associated with the selected page. All event items and all accumulation items for the selected page are then erased to eliminate historical data. Subsequent accumulation items may then be recorded in the selected page. Synchronization of the accumulation items and event items is re-established by erasing all historical accumulation items from the selected page when the selected page recording is reenabled.

18 Claims, 4 Drawing Sheets

CLEAR HISTORIC DATA FROM A VEHICLE DATA RECORDER

TECHNICAL FIELD

The present invention is related to the field of vehicle data recorders.

BACKGROUND ART

High speed microprocessors, electronic fuel injectors, sensors, and actuators allow the operation of modern internal combustion engines and transmissions to be placed under software control. The sensors provide the software with all of the necessary data items required to understand the engine and transmission dynamics, and the electronic fuel injectors and actuators provide a means for implementing control of the various engine and transmission functions. Coupling the microprocessor to a non-volatile memory of a vehicle data recorder permits the software to store various historical data items for later analysis. These data items are often related to the power train, typically the engine and transmission, as well as other vehicle parameters. Data items stored in the memory can be retrieved through reports generated by software executing in the microprocessor or another external computer. Operators and owners of the vehicle can determine from these reports how well the vehicle or operator has been performing as well as various details about trips taken by the vehicle.

The ability of the software to gather and store data items often exceeds the capacity of the non-volatile memory to record that data. Consequently, the user must decide which data items are important and should be recorded in non-volatile memory, and which data items are to be stored in volatile memory. This decision may change from time to time and from user to user. It is therefore desirable to be able to dynamically select which data items are recorded in non-volatile memory.

Data items are often grouped together into pages that are stored in the non-volatile memory. Each page typically contains data items that have some common nexus. For example, all the diagnostics information may be contained on one page while all the engine usage data is contained on a second page. This can lead to confusion and problems as individual data items and individual pages are enabled and disabled for recording data items. A common design practice is to leave historical data items in their respective pages even though recording for that page has been disabled. This leads to the various pages and individual data items being out of sync with each other as a function of time. For example, an enabled diagnostics page may record an engine coolant reaching a high temperature threshold while a disabled engine usage page contains old data showing the engine operating at low idle. Here, maintenance personnel could be easily confused by a report containing simultaneously both the current high coolant temperature diagnostic data and the obsolete low engine idle data.

DISCLOSURE OF INVENTION

The present invention is a method of operating an electronic control module, and an information recording medium recording a computer program executable by the electronic control module, for erasing historic data items when subsequent recording of individual data items or a page of data items has been disabled. Erasing historical data items avoids any confusion that may result from having a mix of obsolete and current data items recorded. Historical data items to be erased fall into at least two categories, event items and accumulation items. Event items that are based on random events such as a variable crossing of a threshold, or a periodic event such as a value at each tick of a clock. Accumulation items generally produce values that tend to move in one direction only, such as a trip odometer.

In operation, the method of the present invention involves disabling recording of the one or more event items associated with a selected page in memory for which recording is to be stopped. Next, all of the event items and all of the accumulation items for that selected page are erased. Accumulator items reflected in the selected page may be allowed to continue to be stored after the selected page has been disabled and erased. As a result, accumulator items on the selected page are erased again when recording in the selected page is reenabled. This is done to maintain synchronization among the event items and the accumulator items recorded in the selected page. Once recording in the selected page has been reenabled, recording of all event items associated with that page are reenabled.

In an alternative embodiment, recording of accumulator items may be suspended in the selected page while the historical data items are being erased. Disabling recording of accumulator items, erasing historical accumulator items, and then reenabling recording of accumulator items prevents updates of accumulator items while the selected page is being erased. This helps maintain synchronization among the individual accumulator items within the selected page.

In another alternative embodiment, recording of accumulator items may be suspended in the selected page and remain suspended after the historical data has been erased. This embodiment maintains synchronization between the accumulator items and event items so that both are disabled, erased, and enabled together.

In yet another alternative embodiment, enablement and disablement for recording data items may be performed at the individual data item level. Here, when one even item of a page is disabled, then all event items of that page are disabled while the historical data items are erased. Recording of all event items, except for the selected event item disabled, is reenabled after erasure is completed. When recording of the selected event item is reenabled then recording of all event items is disabled, the historical data items are erased, and then recording of all event items is reenabled. The same method is be applied to individual accumulator items where recording of all accumulator items is disabled before erasure, and then reenabled after erasure.

Accordingly, it is an object of the present invention to provide a method, and an information recording medium recording a computer program implementing the method, for erasing historical data items in a selected page of a memory when recording for one or more data items in that page have been disabled.

These and other objects, features and advantages will be readily apparent upon consideration of the following detailed description in conjunction with the accompanying drawings.

BEST MODE FOR CARRYING OUT THE INVENTION

Figure 1:
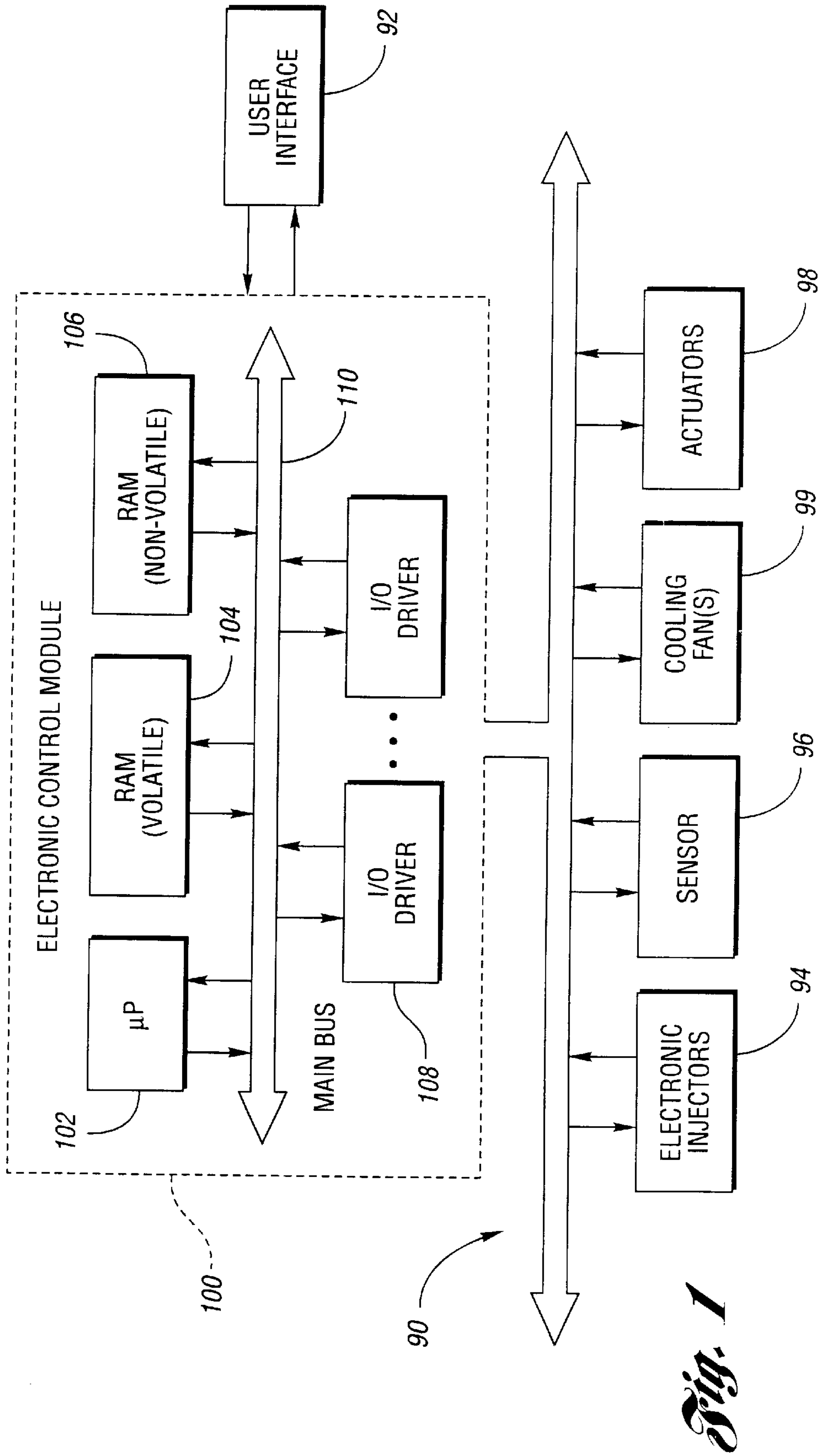
FIG. 1 is a component block diagram of an electronic control module.

FIG. 1 shows an electronic control module (ECM) 100 in communication with typical engine componentry, shown generally to be referenced 90, in a user interface 92. As shown, the ECM 100 includes a microprocessor 102 having volatile random access memory (RAM) 104 and non-volatile random access memory (NVRAM) 106. Of course, the ECM may contain other types of memory instead of, or in addition to RAM 104 and NVRAM 106, such as flash EPROM and EEPROM memories, as is well known in the art.

The NVRAM 106, or other non-volatile memory, may contain instructions that are executed to perform various control and information functions, data tables that contain calibration values and parameters characterizing normal engine operation, and historical data items recorded by software executed by the microprocessor 102. When recording historic data item information, the NVRAM 106 acts as a vehicle data recorder. Another non-volatile memory device (not shown) external to the ECM 100 may also be employed to store the historical data items. Microprocessor 102 imparts control signals to and receives signals from input and output (I/O) drivers 108. The I/O drivers 108 are in communication with the engine componentry 90 and serve to protect the ECM 100 from hostile electrical impulses while providing the signals and power necessary for engine control. The ECM 100 componentry detailed above is interconnected by data, address, and control busses 110. It should be noted that there a variety of other possible control schemes that include various combinations of microprocessors and electric and electronic circuits that could perform the same functions.

Engine componentry 90 includes a plurality of electronic unit injectors (EUI) 94, each associated with a particular engine cylinder (not shown); and a plurality of sensors 96 for indicating various engine operating conditions. Example of these conditions include, but are not limited to, coolant temperature, ambient air temperature, intake manifold air temperature, inlet air temperature, engine oil temperature, fuel temperature, intercooler temperature, throttle position, intake manifold pressure, fuel pressure, oil pressure, coolant pressure, cylinder position, and cylinder sequencing. Engine componentry 90 also include actuators 98 that may include solenoids, variable valves, indicator lights, motors, and generators. It should be appreciated that the ECM 100 may also be in communication with other vehicle componentry 90, such as cooling fans 99 and other microprocessors (not shown) that control associated vehicle systems such as brakes, transmission, a vehicle management system, and a fleet management radio transponder.

User interface 92, also known as a data hub, is used to retrieve data items from the NVRAM 106. The data items are output in the form of reports. Each report is based upon the information stored within a data group. Each data group comprises one or more pages of information. Table 1 shows a typical example of data groups, pages and reports used to store and report recorded data items.

TABLE 1

| Data Groups | Data Page(s) in the Groups | Report(s) |
|---|---|---|
| 1. Activity | Trip<br>Trip Tables<br>Bundled Trip<br>Profile | Trip Activity<br>Monthly Trip Activity<br>Vehicle Speed/RPM<br>Over Speed/Over Rev<br>Engine Load/RPM<br>Profile |
| 2. Diagnostic Records | Detailed Alert | Diagnostic Record |
| 3. Engine Usage | Engine Usage | Daily Engine Usage |
| 4. Maintenance | Service Interval | Periodic Maintenance |
| 5. Incidents | Last Stop<br>Hard Brake | Last Stop Record<br>Hard Brake |
| 6. Always Available | Header<br>Configuration<br>Life-to-Date Totals | Top of all printed reports<br>Configuration<br>Life-to-Date |

Data items stored in NVRAM 106 can be classified as one of three types, event items, accumulation items, and life-to-date items. Event items that are based on random events such as a variable crossing of a threshold, or a periodic event such as a value at each tick of a clock. A variable representing an event item may change value in any direction at any time. An example of a random event type event item is a over pressure sensor than produces a value of false when a sensed pressure is below a set-point, and true when the sensed pressure is above the set-point. This type of event item may be recorded in memory only when its value changes from false to true, and from true to false. Another example of an event item is an oil temperature sensor that produces a value proportional to an oil's temperature. Here, the oil's temperature is recorded periodically. Recorded data items provide a mechanism for detecting trends in the vehicle's operating parameters. Analysis of the recorded data as a function of time allows for prognostics of when operating parameters will reach predetermined thresholds thus allowing for preventative maintenance based upon need rather than time or mileage.

Accumulation items generally produce values that tend to move in one direction only. Examples of accumulator items include, but are not limited to, trip odometers, trip duration, total amount of fuel consumed, and engine hours since last scheduled maintenance. Accumulation items are often used during vehicle operations thus it is desirable to continue recording them in memory even after recording to the associated page has been disabled.

Life-to-date items generally consist of static information that is never changed, and special classes of accumulation information that should never be reset. Examples of static information include header information for the reports, engine configuration information, and transmission configuration information. Examples of accumulation information that should never be reset includes total engine hours and vehicle odometer mileage.

Figure 2:
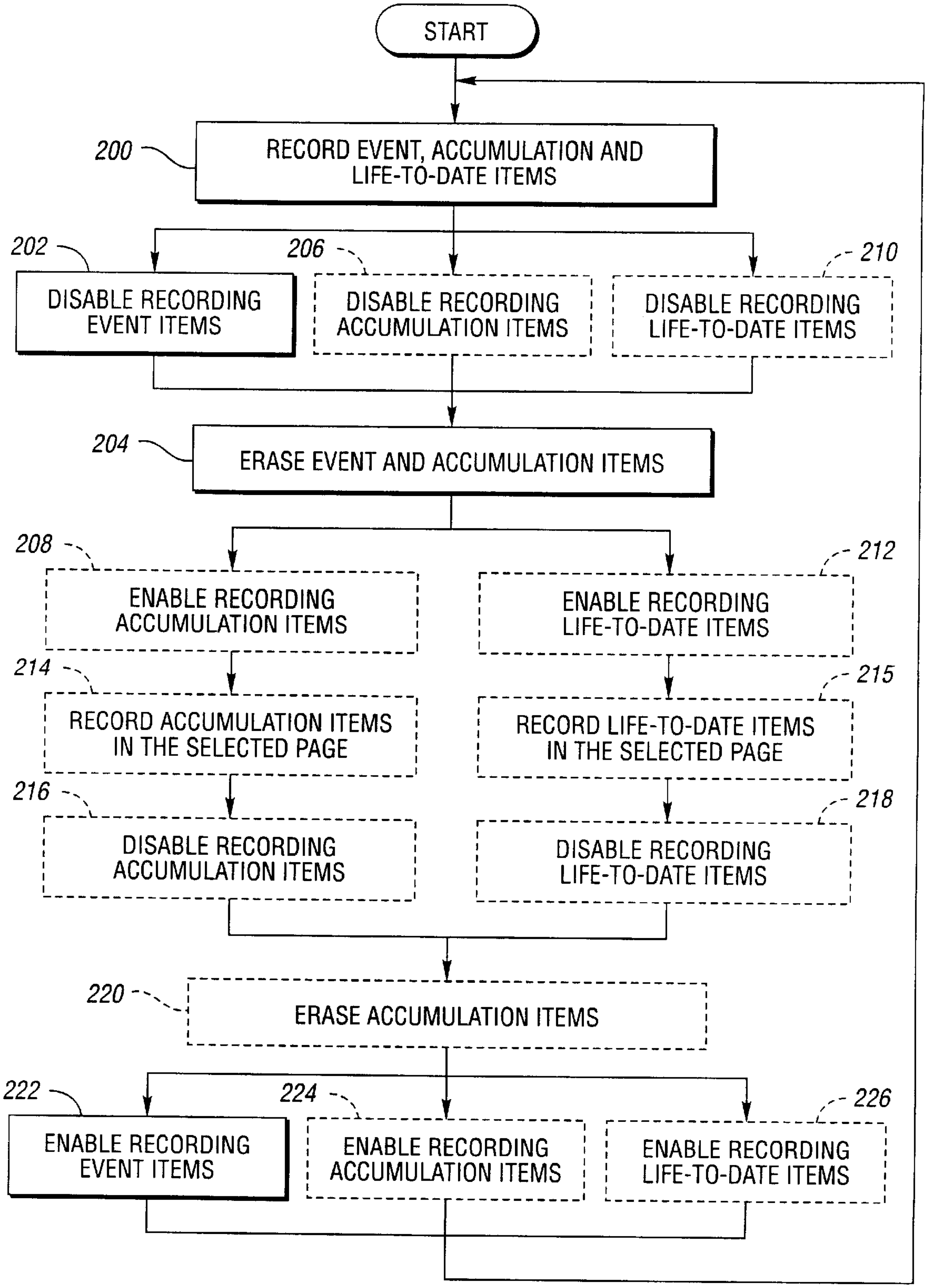
FIG. 2 is a flow diagram of a method for erasing a selected page in memory when enabling and disabling recording to that page.

FIG. 2 is a flow diagram of a method for erasing a selected page in memory when enabling and disabling recording to that page. Disabling, erasing and enabling may be preformed with the vehicle running or not running. This example starts with the microprocessor 102 recording a plurality of data items in one page selected from many pages within the NVRAM 106, as shown in block 200. The plurality of data items recorded in the selected page may consist of any predetermined combination of one or more event items, one or more accumulation items, and one or more life-to-date items.

A stop recording page signal is provided to the ECM 100 through the user interface 92 to stop recording data items on the selected page. The stop recording page signal identifies the selected page from among the several pages for which recording is to be stopped. Upon receipt of the stop recording page signal associated with the selected page recording of all event items in the selected page is disabled, as shown in block 202. All of the data items, except for life-to-date items, are then erased from the selected page, as shown in block 204. Erasing involves writing logical "ones" or logical "zeros" over the existing data items. In the preferred embodiment, the choice of logical ones or logical zeros for erasing will be determined by the lowest energy state of the individual storage cells within the NVRAM 106.

After the non-life-to-date historical data items have been erased, no new event items will be recorded in the selected data page as long as recording to that data page remains disabled. In the preferred embodiment, it is desirable to continue recording accumulation items in the selected page. As such, it is not always necessary to disable recording of accumulation items prior to erasing the historical accumulation items in the selected page.

The present invention accounts for applications where synchronizing erasure among multiple accumulation items is desired. Upon receipt of the stop recording page signal associated with the selected page, recording of accumulation items in the selected page is also disabled, as shown in block 206. After erasing historical accumulation items, as shown in block 204, recording of the accumulation items is reenabled in the selected page, as shown in block 208. At this point the historic event items and historic accumulation items have been cleared from the selected page. From this time forward, the selected page will only contain accumulation items and life-to-date items, if any, recorded after the erasure.

Life-to-date items in the selected page are not to be erased by definition. In some applications, however, the process of erasing event items and accumulation items may interfere with the recording of updated life-to-date items. In these situations, recording of life-to-date items may be suspended momentarily, as shown in block 210. After erasure has been completed, recording of life-to-date items is reenabled as shown in block 212.

Recording of additional accumulator item information may be resumed, as shown in block 214, if recording of accumulation items has been enabled, as shown in block 208. If recording of accumulation items was not enabled in block 208, then recording of additional accumulation items remain disabled. Recording of additional life-to-date item information in the selected page is resumed after recording of these items has been enabled, as shown in block 215. Recording of additional event items information remains disabled from block 202 and thus not performed.

Re-enablement of recording event items to the selected page is initiated with a start recording page signal that identifies the selected page. Current recording of accumulation items and life-to-date items is disabled, if required, as shown in blocks 216 and 218 respectively. Synchronization of new event items with new historical accumulation items is attained by erasing all historical accumulation items in the selected page, as shown in block 220, if recording had been previously enabled in block 208. Next, recording of event items for the selected page is enabled, as shown in block 222. Recording of accumulation items and life-to-date items for the selected page are also enabled if they had been previously disabled, as shown in blocks 224 and 226 respectively. Hereafter, recording of all data items within the selected data page is resumed, as shown in block 200.

For various reasons it may be desirable to enable and disable recording of a specific data item within a page. For example, a data item associated with a known faulty sensor could be disabled to prevent accumulation of erroneous historical information for that sensor. In another example, a selected data item that requires a large amount of memory may be disabled for a time to free the memory for recording other data items.

Figure 3:
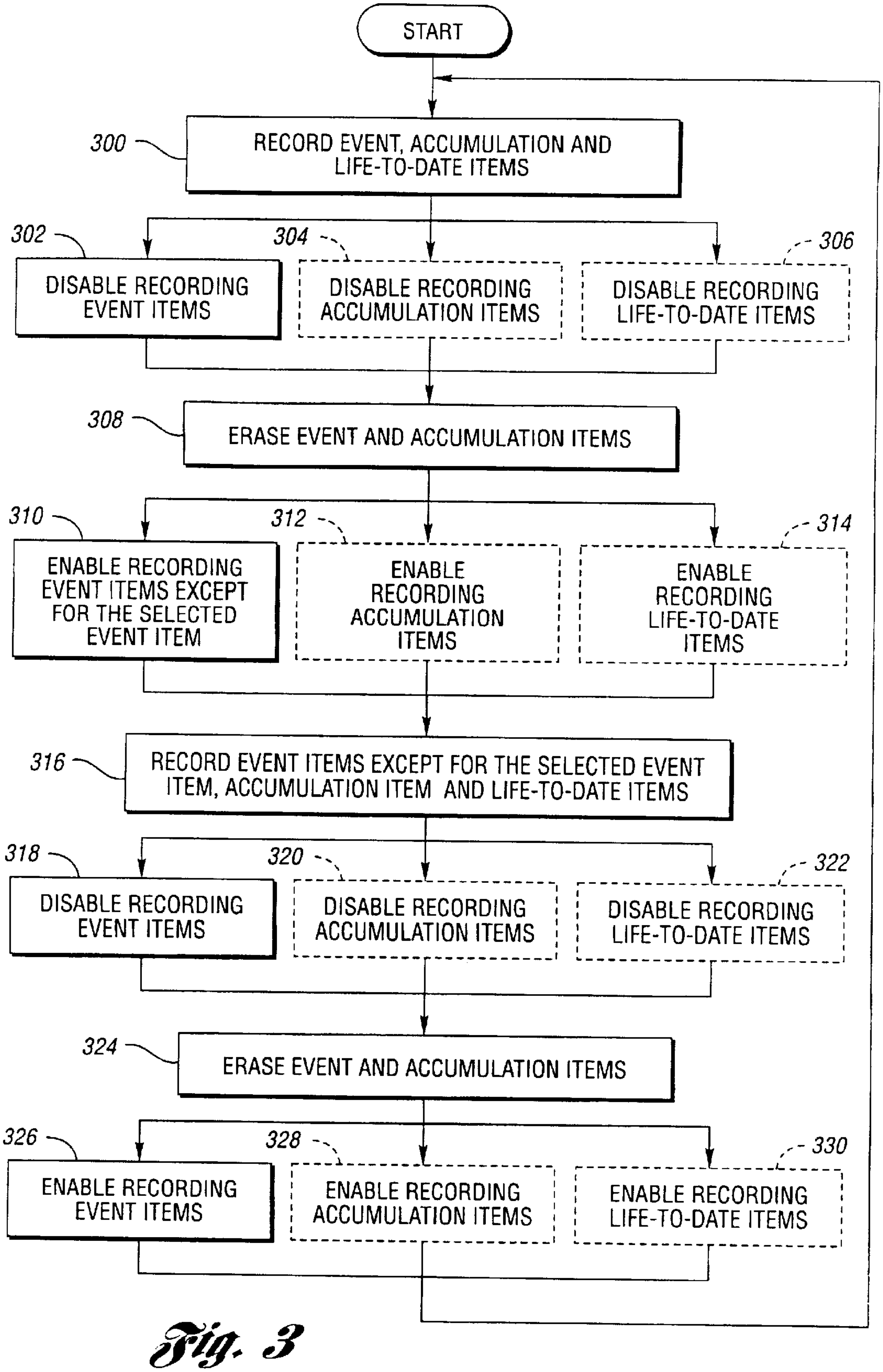
FIG. 3 is a flow diagram of a method for erasing a selected page in memory when enabling and disabling recording of a selected event item in that page.

FIG. 3 is a flow diagram of a method for enabling and disabling recording of a selected event item from a selected page of data items. The process begins in block 300 with recording of event items, accumulation items, and life-to-date items in the selected page being enabled. A stop recording event signal identifying the selected event item within the selected page initiates erasure of all event items and all accumulator items in the selected page. Upon receipt of the stop recording event signal, recording of all event items in the selected page associated with the selected event item is disabled, as shown in block 302. If required to maintain synchronization, recording of all accumulator items, and all life-to-date items may also be disabled, as shown in blocks 304 and 306 respectively. Once recording has been disabled, all event items and accumulator items in the selected page are erased, as shown in block 308.

Recording of all data items, except for the selected event item just stopped, is resumed after erasure has been completed. Recording for all event items except for the selected event item is enabled, as shown in block 310. If required, recording for accumulation items is enabled, as shown in block 312. Finally, recording for life-to-date items is also enabled, as shown in block 314. Recording of event items, life-to-date items, and all event data except for the selected event item then continues, as shown block 316.

Recording for the selected event item is reenabled upon receipt of a start recording event signal identifying the selected event item. As before, recording of all event items is disabled, as shown in block 318. Optionally, recording of accumulation items and life-to-date items are also disabled, as shown in block 320 and 322 respectively. Synchronization among the event items and accumulation items for the selected page is attained by their erasure, as shown in block 324. Recording is enabled for all event items, all accumulator items, and all life-to-date items in the selected page, as shown in block 326, 328, and 330, respectively. Finally, recording of all data items in the selected page resumes as before, as shown in block 300.

Figure 4:
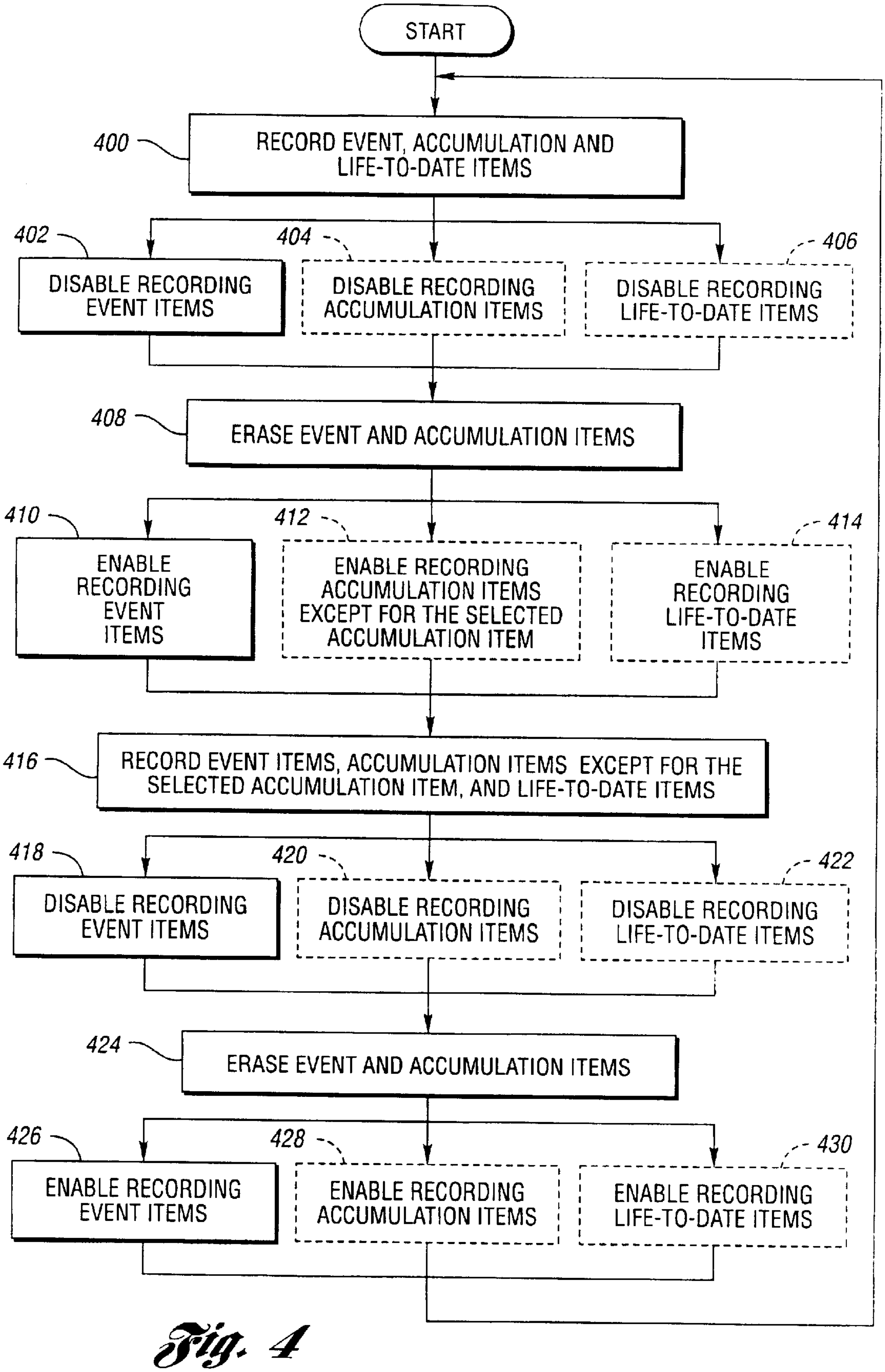
FIG. 4 is a flow diagram of a method for erasing a selected page in memory when enabling and disabling recording of a selected accumulator item in that page.

The present invention also allows for recording disabling and enabling of an individual accumulation item in a selected page. FIG. 4 is a flow diagram of a method for disabling and enabling a selected accumulation item in the selected page. The method starts with the microprocessor 102 recording event items, accumulation items, and life-to-date items in the selected page, as shown in block 400. Recording of all events in the selected page is disabled upon receipt of a stop recording accumulation signal that identifies the selected accumulation item in the selected page, as shown in block 402. As before, recording of all accumulation items and life-to-date items in the selected page may also be disabled, as shown in blocks 404 and 406 respectively. In block 408, all event items and all accumulation items in the selected page are then erased.

Recording for all event items is enabled after erasure is complete, as shown in block 410. Recording of all life-to-date items and accumulation items, except for the selected accumulation item that has been disabled if previously disabled, are enabled, as shown in blocks 412 and 414 respectively. Finally, recording in the selected page continues for all event items, all life-to-date items, and all accumulation items except for the selected accumulation item, as shown in block 416.

Receipt of a start recording accumulation signal that identifies the selected accumulation item in the selected page indicates that recording for the selected accumulation items should be resumed. The start recording accumulation item signal causes recording of event items in the selected page to be disabled, as shown in block 418. Optionally, recording of all other accumulation items and life-to-date items within the selected page may also be disabled, as shown in blocks 420 and 422 respectively.

All event items and all accumulation items in the selected page are then erased, as shown in block 424, to re-synchronize the information. Life-to-date items stored within that selected page are not erased. Recording of the event items for the selected page are then reenabled, as shown in block 426. Recording of the accumulation items and life-to-date items in the selected page are also reenabled if necessary, as shown in block 428 and 430 respectively. Finally, recording of all data items in the selected page is resumed, as shown in block 400.

While embodiments of the invention have been illustrated and described, it is not intended that these embodiments illustrate and describe all possible forms of the invention. Rather, the words used in the specification are words of description rather than limitation, and it is understood that various changes may be made without departing from the spirit and scope of the invention.

What is claimed is:

1. A method of operating an electronic control module disposed on a vehicle and operative to record in a memory a plurality of data items among a plurality of pages, wherein the plurality of data items include at least one event item for the vehicle and at least one accumulation item for the vehicle, the method comprising:

disabling recording of the at least one event item in a selected page of the plurality of pages in response to receiving a stop recording page signal associated with the selected page; and erasing the plurality of data items in the selected page in response to disabling recording of the at least one event item.

2. The method of claim 1 further comprising:

erasing the at least one accumulation item in the selected page in response to receiving a start recording page signal associated with the selected page; and enabling recording of the at least one event item in the selected page in response to erasing the at least one accumulation item in the selected page.

3. The method of claim 1 wherein the at least one event item is a plurality of event items in the selected page, the method further comprising:

disabling recording of the plurality of event items in the selected page in response to receiving a stop recording event signal associated with a selected event item of the plurality of event items in the selected page;

second erasing the plurality of data items in the selected page in response to disabling recording of the plurality of event items;

enable recording of the plurality of event items except for the selected event item in response to second erasing the plurality of data items in the selected page;

second disable recording of the plurality of event items in the selected page in response to receiving a start recording event signal associated with the selected event item in the selected page;

third erasing the plurality of data items in the selected page in response to second disabling recording of the plurality of event items in the selected page; and enable recording of the plurality of event items in the selected page in response to third erasing the plurality of data items in the selected page.

4. The method of claim 1 wherein the at least one accumulation item is a plurality of accumulation items in the selected page, the method further comprising:

second disabling recording of the at least one event item in the selected page in response to receiving a stop recording accumulation signal associated with a selected accumulation item of the plurality of accumulation items in the selected page;

second erasing the plurality of data items in the selected page in response to second disabling recording of the at least one event item in the selected page;

enabling recording of the at least one event item in the selected page in response to second erasing the plurality of data items in the selected page;

third disable recording of the at least one event item in the selected page in response to receiving a start recording accumulation signal associated with the selected accumulation item in the selected page;

third erasing the plurality of data items in the selected page in response to third disabling recording of the at least one event item in the selected page; and enable recording of the at least one event item and the selected accumulation item in the selected page in response to third erasing the plurality of data items in the selected page.

5. The method of claim 1 further comprising:

disabling recording of the at least one accumulation item in the selected page in response to receiving the stop recording page signal associated with the selected page; and enabling recording of the at least one accumulation item in the selected page in response to erasing the plurality of data items in the selected page.

6. The method of claim 1 further comprising:

disabling recording of the at least one accumulation item in the selected page in response to receiving a start recording page signal associated with the selected page;

erasing the at least one accumulation item in the selected page in response to disabling recording of the at least one accumulation item in the selected page; and enabling recording of the plurality of data items in the selected page in response to erasing the at least one accumulation item in the selected page.

7. The method of claim 1 wherein the at least one event item is a plurality of event items in the selected page, the method further comprising:

disabling recording of the plurality of data items in the selected page in response to receiving a stop recording event signal associated with a selected event item of the plurality of event items in the selected page;

second erasing the plurality of data items in the selected page in response to disabling recording of the plurality of data items in the selected page;

enabling recording of the at least one accumulation item and the plurality of event items except for the selected event item in the selected page in response to second erasing the plurality of data items in the selected page;

second disabling recording of the plurality of data items in the selected page in response to receiving a start recording event signal associated with the selected event item in the selected page;

third erasing the plurality of data items in the selected page in response to second disabling recording of the plurality of data items in the selected page; and enable recording of the plurality of data items in the selected page in response to third erasing the plurality of data items in the selected page.

8. The method of claim 1 wherein the at least one accumulation item is a plurality of accumulation items in the selected page, the method further comprising:

disabling recording of the plurality of data items in the selected page in response to receiving a stop recording accumulation signal associated with a selected accumulation item of the plurality of accumulation items in the selected page;

second erasing the plurality of data items in the selected page in response to disabling recording of the plurality of data items in the selected page;

enable recording of the at least one event item and the plurality of accumulation items except for the selected accumulation item in the selected page in response to second erasing the plurality of data items in the selected page;

second disabling recording of the plurality of data items in the selected page in response to receiving a start recording accumulation signal associated with the selected accumulation item in the selected page;

third erasing the plurality of data items in the selected page in response to second disabling recording of the plurality of data items in the selected page; and enabling recording of the plurality of data items in the selected page in response to third erasing the plurality of data items in the selected page.

9. The method of claim 1 further comprising:

disabling recording of the at least one accumulation item in the selected page in response to receiving the stop recording page signal associated with the selected page; and enable recording of the at least one accumulation item and the at least one event item in the selected page in response to receiving a start recording page signal associated with the selected page.

10. An information recording medium for use in an electronic control module operative to record in a memory a plurality of data items among a plurality of pages, wherein the plurality of data items include at least one event item for the vehicle and at least one accumulation item for the vehicle, the information recording medium recording a computer program that is readable and executable by the electronic control module, the computer program comprising:

disabling recording of the at least one event item in a selected page of the plurality of pages in response to receiving a stop recording page signal associated with the selected page; and erasing the plurality of data items in the selected page in response to disabling recording of the at least one event item.

11. The information recording medium of claim 10 wherein the computer program further comprises:

erasing the at least one accumulation item in the selected page in response to receiving a start recording page signal associated with the selected page; and enabling recording of the at least one event item in the selected page in response to erasing the at least one accumulation item in the selected page.

12. The information recording medium of claim 10 wherein the at least one event item is a plurality of event items in the selected page, and the computer program further comprises:

disabling recording of the plurality of event items in the selected page in response to receiving a stop recording event signal associated with a selected event item of the plurality of event items in the selected page;

second erasing the plurality of data items in the selected page in response to disabling recording of the plurality of event items;

enable recording of the plurality of event items except for the selected event item in response to second erasing the plurality of data items in the selected page;

second disable recording of the plurality of event items in the selected page in response to receiving a start recording event signal associated with the selected event item in the selected page;

third erasing the plurality of data items in the selected page in response to second disabling recording of the plurality of event items in the selected page; and enable recording of the plurality of event items in the selected page in response to third erasing the plurality of data items in the selected page.

13. The information recording medium of claim 10 wherein the at least one accumulation item is a plurality of accumulation items in the selected page, and the computer program further comprises:

second disabling recording of the at least one event item in the selected page in response to receiving a stop recording accumulation signal associated with a selected accumulation item of the plurality of accumulation items in the selected page;

second erasing the plurality of data items in the selected page in response to second disabling recording of the at least one event item in the selected page;

enabling recording of the at least one event item in the selected page in response to second erasing the plurality of data items in the selected page;

third disable recording of the at least one event item in the selected page in response to receiving a start recording accumulation signal associated with the selected accumulation item in the selected page;

third erasing the plurality of data items in the selected page in response to third disabling recording of the at least one event item in the selected page; and enable recording of the at least one event item and the selected accumulation item in the selected page in response to third erasing the plurality of data items in the selected page.

14. The information recording medium of claim 10 wherein the computer program further comprises:

disabling recording of the at least one accumulation item in the selected page in response to receiving the stop recording page signal associated with the selected page; and enabling recording of the at least one accumulation item in the selected page in response to erasing the plurality of data items in the selected page.

15. The information recording medium of claim 10 wherein the computer program further comprises:

disabling recording of the at least one accumulation item in the selected page in response to receiving a start recording page signal associated with the selected page;

erasing the at least one accumulation item in the selected page in response to disabling recording of the at least one accumulation item in the selected page; and enabling recording of the plurality of data items in the selected page in response to erasing the at least one accumulation item in the selected page.

16. The information recording medium of claim 10 wherein the at least one event item is a plurality of event items in the selected page, and the computer program further comprises:

disabling recording of the plurality of data items in the selected page in response to receiving a stop recording event signal associated with a selected event item of the plurality of event items in the selected page;

second erasing the plurality of data items in the selected page in response to disabling recording of the plurality of data items in the selected page;

enabling recording of the at least one accumulation item and the plurality of event items except for the selected event item in the selected page in response to second erasing the plurality of data items in the selected page;

second disabling recording of the plurality of data items in the selected page in response to receiving a start recording event signal associated with the selected event item in the selected page;

third erasing the plurality of data items in the selected page in response to second disabling recording of the plurality of data items in the selected page; and enable recording of the plurality of data items in the selected page in response to third erasing the plurality of data items in the selected page.

17. The information recording medium of claim 10 wherein the at least one accumulation item is a plurality of accumulation items in the selected page, and the computer program further comprises:

disabling recording of the plurality of data items in the selected page in response to receiving a stop recording accumulation signal associated with a selected accumulation item of the plurality of accumulation items in the selected page;

second erasing the plurality of data items in the selected page in response to disabling recording of the plurality of data items in the selected page;

enable recording of the at least one event item and the plurality of accumulation items except for the selected accumulation item in the selected page in response to second erasing the plurality of data items in the selected page;

second disabling recording of the plurality of data items in the selected page in response to receiving a start recording accumulation signal associated with the selected accumulation item in the selected page;

third erasing the plurality of data items in the selected page in response to second disabling recording of the plurality of data items in the selected page; and enabling recording of the plurality of data items in the selected page in response to third erasing the plurality of data items in the selected page.

18. The information recording medium of claim 10 wherein the computer program further comprises:

disabling recording of the at least one accumulation item in the selected page in response to receiving the stop recording page signal associated with the selected page; and enable recording of the at least one accumulation item and the at least one event item in the selected page in response to receiving a start recording page signal associated with the selected page.

* * * * *